United States Patent [19]

Bedford

[11] 4,232,186

[45] Nov. 4, 1980

[54] METHOD OF AND MEANS FOR GENERATING COMPLEX ELECTRICAL CODING WAVES FOR SECRET COMMUNICATIONS

[75] Inventor: Alda V. Bedford, Princeton, N.J.

[73] Assignee: RCA Corporation, New York, N.Y.

[21] Appl. No.: 546,189

[22] Filed: Jul. 22, 1944

[51] Int. Cl.³ .............................................. H04K 9/04
[52] U.S. Cl. ......................................... 178/22; 331/78
[58] Field of Search .................. 179/1.5; 178/22, 69.5; 331/78

[56] References Cited

U.S. PATENT DOCUMENTS

| | | | |
|---|---|---|---|
| 1,495,470 | 5/1924 | Farrington | 179/1.5 |
| 1,592,940 | 7/1926 | Kendall | 179/1.5 |
| 1,940,016 | 12/1933 | Ranger | 178/69.5 |
| 2,110,698 | 3/1938 | Charrier | 179/1.5 |
| 2,145,332 | 1/1939 | Bedford | 179/15 PG |
| 2,169,357 | 8/1939 | Hansell | 179/1.5 |
| 2,172,354 | 9/1939 | Blumlein | 179/15 A |
| 2,262,838 | 11/1941 | Deloraine et al. | 179/1.5 |
| 2,272,070 | 2/1942 | Reeves | 179/1.5 |
| 2,401,403 | 6/1946 | Bedford | 179/1.5 |
| 2,401,447 | 6/1946 | Wipff | 179/1.5 |
| 2,403,561 | 7/1946 | Smith | 179/15 PG |
| 3,373,245 | 3/1968 | Newby et al. | 178/22 |

Primary Examiner—Howard A. Birmiel
Attorney, Agent, or Firm—Samuel Cohen; Robert L. Troike

EXEMPLARY CLAIM

10. Apparatus for generating a complex wave comprising means for generating a plurality of different concurrent short period series of pulses, a plurality of electrical networks, means for applying a different one of said series of pulses to each of said electrical networks, means for deriving a plurality of differently delayed unmodulated pulse signals from each of said networks in response to said applied series of pulses, means for combining said derived signals from predetermined ones of said networks, and means for selecting in a predetermined manner said delayed signal components, and means for deriving from said selected signal components a complex wave having a period longer than either of said selected pulse periods, said complex wave having a substantially longer period than either of said short period pulse series.

23 Claims, 14 Drawing Figures

METHOD OF AND MEANS FOR GENERATING COMPLEX ELECTRICAL CODING WAVES FOR SECRET COMMUNICATIONS

The present invention relates to secret telecommunication systems and more particularly to an improved method of and means for generating, employing, and synchronizing complex coding and decoding signals in such systems.

The invention, by way of example, will be described hereinafter as an improvement in coding wave generators which may be employed in a secret telecommunication system of the type described in applicant's copending U.S. application Ser. No. 536,630, filed May 20, 1944, now U.S. Pat. No. 2,401,405, granted June 4, 1946. The copending application discloses a system wherein, for example, a speech signal comprising a complex wave S is modified by means of a coding signal comprising a complex wave K in a manner whereby the instantaneous ordinates of the resulting coded signals are the product SK of the corresponding instantaneous ordinates of the speech signal and the coding signal. The resulting unintelligible coded signals are transmitted by any conventional means to a receiver wherein the coded signals are combined with decoding signals generated in the receiver and having instantaneous ordinates corresponding to the reciprocal of the corresponding instantaneous ordinates of the coding signal component of the transmitted signal. The final signals, therefore, are derived from the product of the transmitted signal SK and the decoding signal 1/K. The coding and decoding signal generators at the transmitter and receiver, respectively, are disclosed in said copending application as synchronized by means of special synchronizing pulse signals each comprising a first signal pulse immediately followed by a second signal pulse of opposite polarity, which pulses may be superimposed upon the coded signals SK. At the receiver, the reversal in polarity between the two synchronizing pulses is employed to synchronize the decoding wave generator.

The instant invention comprises an improvement over the coding wave generator described in said copending application, which also is described and claimed in applicant's copending application, Serial No. 514,351, filed Dec. 15, 1943, now U.S. Pat. No. 2,401,403, granted June 4, 1946. Applicant's prior generator employed an eighty section delay network excited by 100 pulses per second, the delayed pulses at a plurality of points in the network being combined in predetermined polarities by a continuously changing selecting mechanism to provide a complex wave having a network periodicity of 0.01 second which, because of the switching mechanism, is non-repetitive for a period of about five minutes. The instant invention provides greatly increased security by employing two separate delay networks, each having about 40 sections, which are separately excited by pulses of different rates and switched by a more complex differential speed selecting mechanism to provide a much more complex coding wave having a combined network periodicity of about 0.4 second, which by means of the switching is non-repetitive for a period of about one hour. Thus by employing the instant invention the complexity and repetition rate of the code wave is comparable to that obtainable with a single delay network of the order of 3000 sections, which would be highly impracticable.

Among the objects of the invention are to provide an improved method of and means for generating complex electrical waves. Another object is to provide an improved method of and means for coding and decoding message signals in a secret telecommunication system. An additional object is to provide an improved method of and means for generating a complex electrical wave having a relatively long period by combining two less complex waves each having relatively short periods. A further object of the invention is to provide an improved wave generator comprising a plurality of delay networks separately pulse-excited at different frequencies, means for deriving predetermined delayed pulse components of predetermined relative polarity from each of said networks and means for combining said delayed components from said networks to provide a complex electrical wave. Another object of the invention is to provide such an improved wave generator wherein the delayed pulse components of predetermined polarity are combined by multiplying the instantaneous ordinates of the wave components derived from each delay network. Another object is to provide such an improved wave generator wherein the delayed pulse components of predetermined polarity derived from each delay network are combined algebraically to provide the complex wave.

Other objects include improved methods of and means for changing the characteristics of a complex wave in a predetermined irregular manner. An additional object is to provide an improved method of and means for generating complex electrical waves of relatively long periodicity which are non-repetitive for a relatively long time interval. A further object is to provide improved methods of and means for synchronizing a plurality of such complex wave generators.

The invention will be described in greater detail by reference to the accompanying drawings of which

Similar reference characters are applied to similar elements throughout the drawings.

CODING WAVE GENERATOR

Generator Unit—A'

Figure 1:
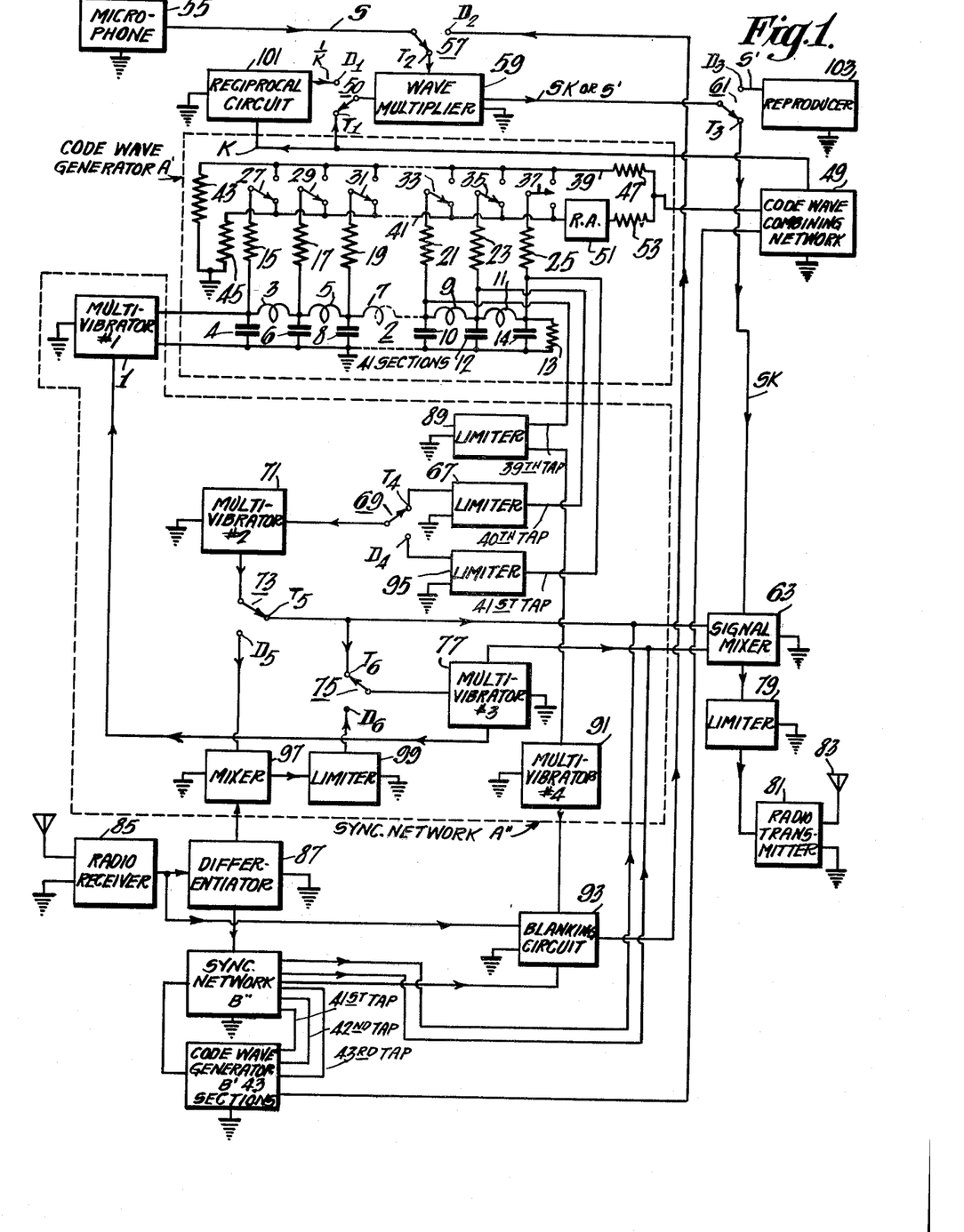
FIG. 1 is a schematic, partly block diagram of a complete secret telecommunication system employing the invention.

Referring to FIG. 1, the coding wave generator which may be employed alternately for both transmitting and receiving coded speech signals includes a conventional free running multivibrator circuit 1 which generates pulses at a rate, for example, of 47.7 pulses per second. A typical multivibrator of this type, the frequency of which may be controlled by recurrent applied control pulses, is described in U.S. Pat. No. 2,266,526, granted to E. L. C. White on Dec. 16, 1941. The generated pulses are applied to the input of a first conventional delay network 2 comprising a plurality of series-connected inductors 3, 5, 7, 9, 11 and a plurality of shunt-connected capacitors 4, 6, 8, 10, 12, 14. The remote terminals of the resultant pulse delay network 2 are terminated by a resistor 13 matching the surge impedance of the network. It should be understood that the delay network 2 may include, for example, forty-one filter sections as indicated by the dash lines interconnecting the filter sections 7, 8 and 9, 10, and that equalizers and booster amplifiers may be inserted in the delay network at desired points to maintain pulse amplitude relations at optimum values.

Pulses applied by the multivibrator 1 to the input of the delay network 2 provide similar pulses at the junction of each of the succeeding series inductors 3, 5, 7, 9, 11, whereby each succeeding pulse is delayed a predetermined amount with respect to pulses occurring at other prior network terminals. A complex coding wave thus may be obtained in response to each pulse applied to the delay network by combining in either polarity differently delayed pulses derived from a plurality of such predetermined points along the delay network.

Separate isolating resistors 15, 17, 19, 21, 23, 25 each have one terminal connected to different points along the delay network, and have their remaining terminals connected to separate movable contacts of a plurality of single-pole double-throw switches 27, 29, 31, 33, 35, 37. The corresponding fixed contacts of the several switches are connected together to provide two lines 39, 41, which are terminated through resistors 43, 45 respectively, to ground. The remaining terminal of the line 39 is connected through a coupling resistor 47 to the input of a code wave combining network 49 which may be of either of the types described in detail hereinafter by reference to FIGS. 4 or 7.

The output of the code wave combining network is connected to one fixed contact $T_1$ of a first transmit-receive single-pole, double-throw switch 50. The remaining terminal of the second line 41 is connected through a polarity reversing amplifier 51, and through a second coupling resistor 53 to said first coupling resistor 47 to the input of the combining network 49. Thus each of the pulses derived from the multivibrator 1 and applied to the input of the delay network 2, provides a plurality of pulses of either polarity occurring at predetermined intervals during each applied pulse period, as determined by the points of connection to the delay network and the arrangement of the switches 27, 29, 31, 33, 35, 37. Therefore, a complex coding wave component may be applied to the input circuit of the code wave combining network 49 merely by selecting the desired arrangement of the pulse selecting switches. It should be understood that the total delay provided by the pulse delay network preferably is slightly less than the pulse period of the multivibrator 1 in order that only one pulse may be traveling along the delay network at any predetermined instant.

To this point, the coding wave generator A' is similar to that described in applicant's copending application Ser. No. 514,351, filed Dec. 15, 1943, now U.S. Pat. No. 2,401,403, granted June 4, 1946, except that herein the coding signal generator A' includes a delay network having, for example, only forty-three sections and the plurality of sequential switches may be operated to provide any desired code and selectively actuated by a motor or clock mechanism to change the code continuously or at predetermined desired intervals in a complex manner as described hereinafter in FIGS. 11 and 12.

UNIT B'

A second code wave generator B', similar in all respects to the first code wave generator A', with the exception that two additional delay network sections are employed, is connected to operate at a different pulse exciting rate in conjunction with a second portion of the delay network switching device.

The output network of the second code wave generator B', and the output network 47, 53 of the first code wave generator A' are both connected to the code wave combining network 49, as described heretofore, whereby the complex code waves derived from both code wave generators may be combined, as described in detail hereinafter, to provide a much more complex code wave which is non-repetitive for a period of the order of 0.4 of a second. Since the switching mechanism, to be described in detail hereinafter with respect to FIGS. 11 and 12, continuously switches the output connections to the two code wave generators, and since said switching mechanism may be designed to provide an extremely large number of switching combinations, the resultant code may be made to be non-repetitive for a period of the order of one hour.

Identical combinations of coding signal generators and code signal combining networks are employed at both the transmitter and receiver in such a secret telecommunication system. By means of a plurality of simple "transmit-receive" switches, which may be ganged together, the final complex combined coding signal either is combined with the speech signal for transmitting a coded wave, or reciprocal values of the coding signal are derived from a reciprocal circuit responsive to the coding signal generator and are combined with the received coded signal to decode said received signal. Much of the decoding apparatus including the generators for the code signal are identical to the coding apparatus. Hence, by means of the simple "transmit-receive" switches, the various elements of the apparatus may be employed at different times for dual purposes in a single unit for either transmitting or receiving the coded signals.

CODING TRANSMITTER

Figure 2:
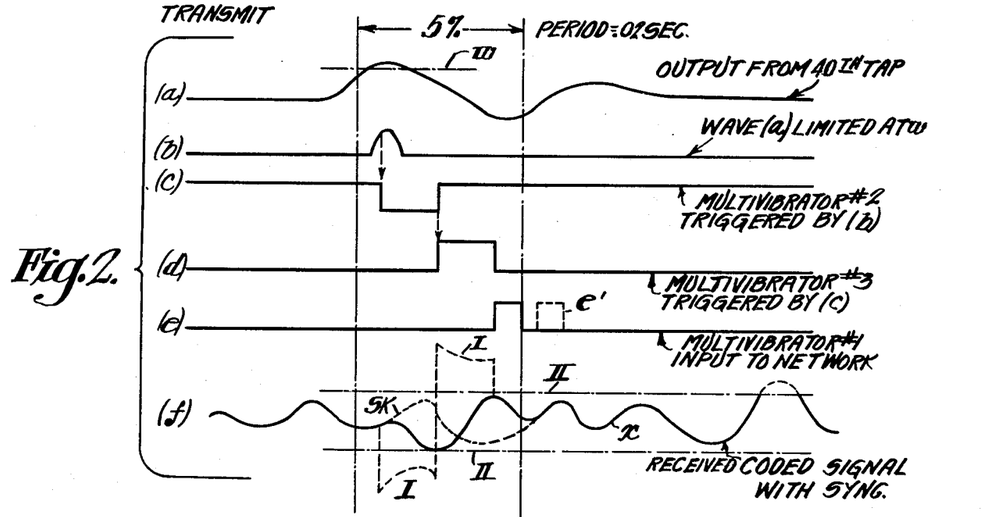
FIG. 2 is a series of graphs illustrating the transmitter synchronizing circuits of one of the wave generators of the system of FIG. 1.

Referring to FIGS. 1 and 2, the system may be employed as a coding transmitter by switching the movable contacts of each of the single-pole, double-throw "transmit-receive" switches included therein to engage the fixed contacts T₁, T₂, T₃, T₄, T₅, T₆, etc. corresponding to the "transmit" condition. Signals derived, for example, from a microphone 55, which may be fed through a speech amplifier, not shown, are applied through a second "transmit-receive" switch 57 to one input circuit of a wave multiplier 59, which will be described in detail hereinafter by reference to FIG. 9 of the drawing. Coding signals, from the coding signal generator combining network 49 are applied, through the first switch 50, to a second input circuit of the wave multiplier 59, whereby coded signals SK having instantaneous ordinates corresponding to the products of the corresponding instantaneous ordinates of the speech signal S and the coding signal K are applied through a third "transmit-receive" switch 61 to one input circuit of a first signal mixer circuit 63, which may comprise any conventional network wherein applied signals are combined algebraically.

TRANSMITTER SYNCHRONIZING PULSE GENERATOR

Synchronizing Unit A″

Regularly recurrent pulses indicated by the graph (a) of FIG. 2 are derived, for example, from the fortieth tap on the delay network 2 of the code wave generator A′ and applied to a conventional thermionic tube amplitude limiter circuit 67, which clips the wave (a) at the level (w) to derive individual limited pulses represented by graph (b) of FIG. 2. The limited pulses (b) are applied through a fourth "transmit-receive" switch 69 to key a second multivibrator 71 to derive a negative, substantially square-wave pulse illustrated by graph (c) of FIG. 2. The negative square wave pulse (c) is applied through a fifth "transmit-receive" switch 73 to a second input circuit of the first signal mixer circuit 63, and is applied through a sixth "transmit-receive" switch 75 to key a third multivibrator 77 which generates a positive square wave pulse indicated by the graph (d) of FIG. 2. It will be understood that the positive square wave pulse (d) will be initiated at the termination of the negative square wave pulse (c) in a manner well known in the multivibrator art. The positive square wave pulse (d) is applied to a third input circuit of the signal mixer circuit 63 whereby the coded signal SK, the negative square wave SK, pulse (c) and the positive square wave pulse (d) are combined with similar differently timed synchronizing pulses derived from a similar synchronizing network B″ operated in combination with the second code wave generator B′ to provide a communication signal including the coded wave and the two groups of synchronizing signals each comprising a negative square wave pulse immediately followed by a positive square wave pulse. The combined coded signal and one group of synchronizing signals derived from the signal mixer 63 will have a wave form, for example, of the type illustrated in graph (f) of FIG. 2, including the pulses I, I, shown in dash lines.

A pulse derived from the third multivibrator 77 also is applied to key the first multivibrator 1 to generate a positive square wave pulse (e), illustrated in FIG. 2, which is applied to the input of the delay network 2 to initiate a succeeding pulse which will be progressively delayed along the delay network. Since the first multivibrator 1 is keyed by the pulse from the third multivibrator 77 immediately preceding the time for the generation of a normal pulse by said first multivibrator, it will be seen that the coding wave generator will be self-running, and will be maintained at a substantially constant frequency since the pulse rate therethrough will be substantially dependent upon the time delay of the successive pulses applied to the delay network 2. If for any reason the first multivibrator 1 is not properly keyed by the third multivibrator 77, the first multivibrator merely will generate a pulse (e′) which will be applied to the delay network 2 at a slightly later interval. The slightly delayed pulse upon reaching the fortieth tap of the delay network therefore will key the second and third multivibrators in the manner described heretofore and provide a new set of synchronizing pulses which will actuate the first multivibrator 1 in synchronism thereafter.

SYNCHRONIZING UNIT B″

As explained briefly heretofore, the second synchronizing unit B″ for the second code wave generator B′ is similar to the first synchronizing network A″ with the exception that the multivibrators thereof are operated at a slightly different frequency than the corresponding multivibrators of the first synchronizing network A″. The synchronizing pulses derived from the second synchronizing network B″ are applied to the signal mixer circuit 63 in the same manner that corresponding, but differently timed synchronizing pulses, are derived from the first synchronizing network A″. Hence, the synchronizing pulses from the second synchronizing network B″ are merely added to the transmitter coded signal which is applied through the signal limiter 79 to the radio transmitter 81 when the system is employed for transmission.

The coded signals SK combined with the synchronizing pulses (c) and (d) derived from each of the synchronizing networks are applied to a second limiter 79 whereby the high amplitude portions I of the synchronizing signal are clipped to a maximum level II indicated by the dash lines in graph (f) of FIG. 2. The thus limited combined coded and synchronizing signals are applied as a communication signal to a conventional radio transmitter 81 which includes a transmitting antenna 83.

CODED SIGNAL RECEIVER

In order to convert the circuit thus described to operate as a coded signal receiver, the movable contacts of each of the "transmit-receive" switches 50, 57, 61, 69, 73 and 75 are switched to the corresponding fixed contacts D₁, D₂, D₃, D₄, D₅, D₆ corresponding to the "receive" condition. The combined coded signal and synchronizing signals transmitted from the transmitter 81 may be "smeared" and phase-shifted somewhat due to infidelity of the transmitter to resemble the solid portion x of the graph (f) of FIG. 2. As received by means of a conventional radio receiver 85 the signals are applied to a conventional wave differentiating network 87 which may be of any type well known in the art. For example, a wave may be differentiated by applying it to a network comprising a small series capacitor and shunt resistor. The transmitted signal (x) of FIG. 2 after being differentiated at the receiver resembles the graph (g) of FIG. 3 wherein a relatively large pulse P occurs at an instant corresponding to the reversal in polarity between the received synchronizing negative and positive pulses and wherein low frequency components are substantially removed from the pulse P. It should be understood that instead of differentiating the received signal, it may be treated in any other known manner to derive a pulse in response to the reversal in polarity of the negative and positive synchronizing pulses.

Figure 3:
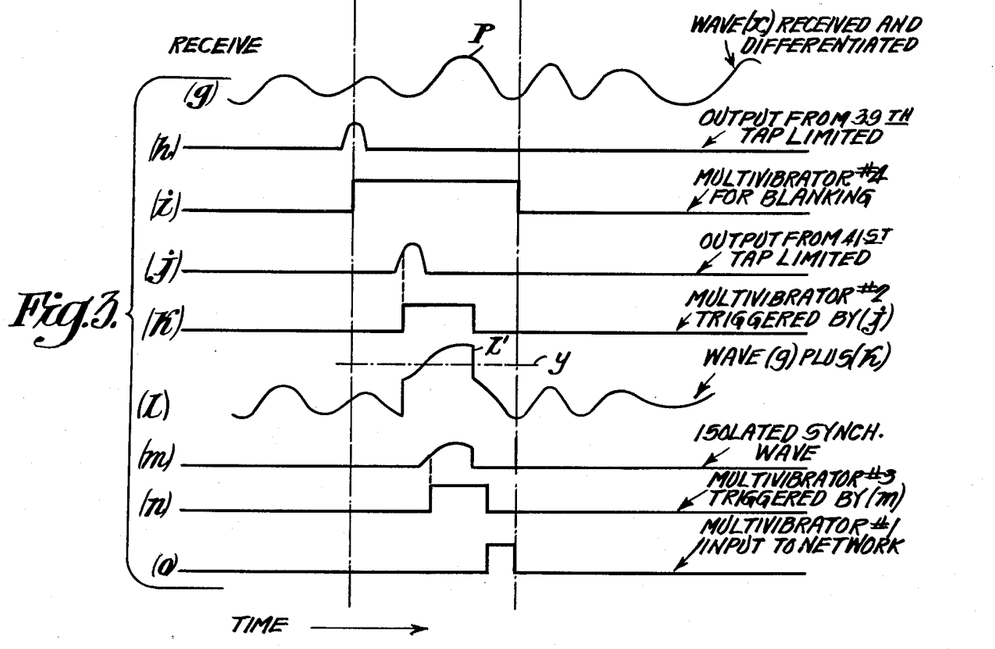
FIG. 3 is a series of graphs illustrating the operation of one of the decoding wave generators of the receiver portion of the system illustrated in FIG. 1.

The receiver first multivibrator 1 being free running, as described heretofore, the delay network 2 will provide recurrent pulses at its thirty-ninth tap which will be limited by means of a third limiter 89 to provide limited pulse represented by the graph (d) of FIG. 3. The thus limited pulses (h) are applied to key a fourth multivibrator 91 which generates a relatively long blanking pulse illustrated in graph (i) of FIG. 3. The long blanking pulse (i) is applied to a blanking circuit 93 which blanks out portions of the received signal as will be explained in greater detail hereinafter.

RECEIVER SYNCHRONIZING CIRCUITS

Unit A"

Similarly, each of the recurrent pulses derived from the forty-first tap of the delay network 2 are applied to a fourth limiter 95 which clips the upper portion of the applied pulse as explained heretofore with respect to pulse (b), to provide a similar but later short pulse illustrated by graph (j) of FIG. 3. The limited pulse (j) is applied through the fourth "transmit-receive" switch 69 to key the second multivibrator 71 to provide a relatively long positive square wave pulse (k). It will be noted that the positive pulse (k) is of relatively longer duration than the negative pulse (c) previously described as generated by the second multivibrator 71 when said multivibrator is employed in the transmitting circuit. The different pulse polarity and duration may be accomplished in any well known manner by changes provided in the multivibrator circuit constants and the connections thereto when the multivibrator is switched from the "transmitting" to the "receiving" condition.

The positive square wave pulse (k) derived from the second multivibrator 71 is applied through the fifth "transmit-receive" switch 73 to a second mixer circuit 97, to which also is applied the differentiated wave (g) derived from the differentiating circuit 87. The thus mixed signals illustrated by graph (l) of FIG. 3 include a pulse peak (l') which corresponds in time to the occurrence of the large positive pulse P of the differentiated received wave (g). As explained heretofore, the pulse P corresponds to the reversal in polarity of the received synchronizing negative and positive pulses. The wave (l') derived from the second mixer circuit 97 is applied to a fifth limiter 99 which clips the mixed signal at a level (y) to provide in its output circuit a short somewhat triangular pulse, illustrated by graph (m) of FIG. 3.

The triangular pulse (m) is applied through the sixth "transmit-receive" switch 75 to key the third multivibrator 77 to provide a positive pulse represented by graph (n) of FIG. 3 which is applied to key the first multivibrator 1 as described heretofore with respect to the pulse (d) in the transmitting network. It should be understood that, if desired, for extremely precise synchronism, the pulse (m) may be changed from triangular to square wave shape by clipping at a low level, and then by amplifying the clipped lower portion of the pulse in a manner known in the art. The pulse (n) therefore causes the first multivibrator 1 to generate a positive pulse (o) which is applied to the delay network 2 in the same manner as described heretofore with respect to the positive pulse (e) of the transmitting network.

As explained heretofore with respect to the operation of the multivibrator circuits in the "transmitting" condition, if the circuit falls out of synchronism, the various multivibrators will provide pulses at somewhat increased time intervals until such time as a synchronizing pulse occurs at a proper instant to pull all of the multivibrators back into synchronism. Since pulses are derived from the delay network 2 at intervals of the order of 0.02 second, it is apparent that the various circuits will fall into synchronism in a relatively short time which seldom will exceed one full second.

Due to phase distortion in the transmission or radio circuit interconnecting the transmitter and receiver units, it is possible that the effective time of occurrence of the received synchronizing pulses will vary in different receivers with respect to the received coded speech. To correct for such variations, the circuit constants of the third multivibrator 77 may, in any known manner, be altered in the receiving condition so that the width of the pulse (n) may be varied to provide keying of the first multivibrator 1 at the precise desired instant. The manner of varying the circuit constants of multivibrators to provide pulses of derived polarity and duration in response to predetermined applied keying pulses is known in the art.

SYNCHRONIZING OF UNIT B"

In the receiving condition, the various transmit-receive switches of the second synchronizing network B" are placed in the "receive" condition in the same manner as the corresponding switches described heretofore in the first synchronizing network A". The second synchronizing network B" is connected to the receiver differentiator circuit 87 in the same manner that the first synchronizing network A" is connected to said differentiator, whereby similar additional synchronizing pulses to those indicated by the portion P of graph (g) of FIG. 3 are employed to synchronize the second code wave generator B' at the receiver with a corresponding similar second code wave generator at the transmitter.

As will be explained in greater detail hereinafter, the multivibrator 1 of the first synchronizing network A" is driven at a different frequency than the corresponding first multivibrator of the second synchronizing network B". Hence, the synchronizing pulses for the code wave generator A' will occur at different times than the synchronizing pulses for the code wave generator B', except at intervals of the order of 0.4 of a second when such pulses for both code wave generators occur simultaneously.

The second synchronizing network B" is connected to the blanking circuit 3 in the same manner that the first synchronizing network A" is connected to said blanking circuit, thereby insuring that both sets of the synchronizing pulses will be deleted from the received signal before it is decoded.

While the two synchronizing networks A" and B" cannot distinguish in amplitude between the different large amplitude pulses P shown in graph (g) of FIG. 3, the circuits are responsive only to synchronizing pulses which occur during the brief intervals wherein the multivibrator 2 pulse shown in graph (k) of FIG. 3 occurs simultaneously with the reception of the corresponding large amplitude synchronizing pulses P of graph (g). As explained heretofore, either of the synchronizing systems for either of the code wave generators A' or B' may get "out of step" with the corresponding received synchronizing pulses. However, the second synchronizing network B" also is "self-running" in the same manner as described heretofore for the first synchronizing network A", whereby either synchronizing network will fall into step after a brief unsynchronized interval.

SIGNAL DECODING SYSTEM

The received signals derived from the radio receiver 85 are applied to the input of the blanking circuit 93 which interrupts the received coded signals during the occurrences of the recurrent blanking pulses (i), whereby the transmitted positive and negative synchronizing pulses for both code wave generators may be removed from the received coded sgnal. This condition obtains when the coding signal generators of the receiver are in synchronism with the transmitter coding signal generators, since the fourth multivibrator 91 is responsive to pulses derived from the second from last taps on each of the delay networks.

Blanking circuits are well known in the art. They may comprise, for example, a push-pull amplifier for the signal, arranged so that the blanking pulses (i) are superimposed on the grid-cathode circuits so that both tubes are simultaneously driven to cut-off during the blanking period.

The thus blanked, received signals comprise the transmitted signal components SK which are applied through the second "transmit-receive" switch 57 to one of the input circuits of the wave multiplier 59.

Similarly, the coding signals K generated by the receiver coding generators and code wave combining circuit 49 are applied to the input circuit of a reciprocal circuit 101, which will be described in detail hereinafter by reference to FIG. 10 of the drawings. Signals derived from the reciprocal circuit 101 will have instantaneous ordinates corresponding to the reciprocal values of the instantaneous ordinates of the synchronized coding wave K generated in the receiver. The reciprocal wave 1/K is applied through the first "transmit-receive" switch 50 to a second input circuit of the multiplier 59. Since the wave multiplier 59 provides output signals which have instantaneous ordinates corresponding to the product of the instantaneous ordinates of the wave 1/K and SK applied thereto, the output signals applied through the third "transmit-receive" switch 61 to a reproducer 103 will be substantially characteristic of the original speech modulation signals S. The signals applied to the reproducer 103 have been indicated as S' since some phase distortion is inherent in the various circuits described and especially in many radio transmission circuits. It should be understood that the signals S' derived from the third "transmit-receive" switch 61 may be applied to actuate any other desired type of utilization apparatus, not shown.

Figure 4:
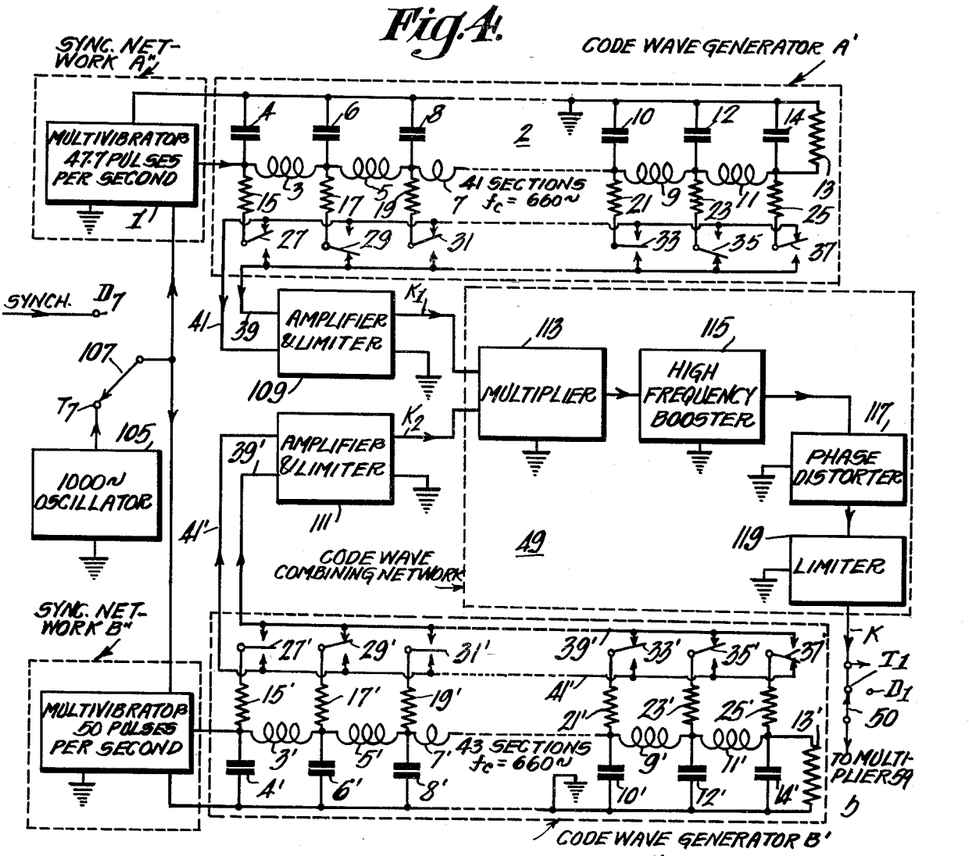
FIG. 4 is a schematic, partly block circuit diagram of one embodiment of the invention.

In FIG. 4, a preferred embodiment of the invention comprises two separate code wave generators A' and B', having separate independent synchronizing networks A" and B" including multivibrators 1, 1' which excite them at different frequencies, such, for example, as 47.7 pulses per second and 50 pulses per second, which are, respectively, the 21st and 20th submultiples of the frequency of a 1000 cycle driving oscillator 105. When employed as a code wave transmitting device, the 1000 cycle oscillator 105 is connected through a seventh "transmit-receive" switch 107 to actuate the multivibrators 1, 1' at the 21st and 20th submultiple frequencies. When the system is employed for the reception of coded signals, the movable contact of the switch 107 is connected to its fixed contact $D_7$ which applies synchronizing pulses to both multivibrator synchronizing networks A" and B" from the differentiator circuit 87 as described heretofore.

The first code wave generator A' may include, for example, forty-one delay network sections of the type described heretofore in FIG. 1, having a total dealy of 1/47.7 seconds which results in a cutoff frequency of the order of 660 cycles. The second code wave generator B' may include, for example, forty-three delay network sections having a similar cutoff frequency, but providing a delay of the order of 1/50 second.

As a matter of convenience, circuit components of the second code wave generator B' and second synchronizing network B" are given primed reference characters corresponding to the component reference characters in the first code wave generator A' and synchronizing network A". The coding switches 27, 29, 31, 33, 35, 37 and 27', 29', 31', 33', 35', 37', for selecting delayed pulses from preselected terminals of both delay networks, may be combined in a differential-speed, multi-section switching unit of the type shown in FIGS. 11 and 14 and described in detail hereinafter.

Figure 6:
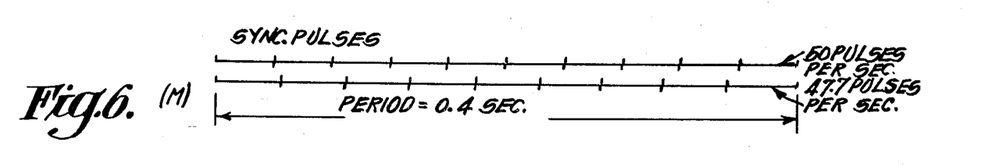
FIG. 6 is a graph illustrating the synchronization pulse timing of the combined pulse generator circuits shown in FIG. 4.

As explained heretofore, the 47.7 and 50 cycle synchronizing pulses for both code wave generators are transmitted along with the coded speech signal. Reference to graph (M) of FIG. 6 shows that the synchronizing pulses fo each of the code wave generators coincide at intervals of the order of 0.4 second, while they occur at different relative times during this period. The 47.7 cycle and 50 cycle synchronizing pulses are operative only upon the synchronizing network having the corresponding pulse period since the actuating pulse shown in graph (k) of FIG. 3 must occur simultaneously with the reception of a proper synchronizing network to actuate each particular synchronizing network. Since each set of synchronizing pulses requires only about five percent of the transmission time for the coded message, and since two such sets of synchronizing pulses occur during about each fiftieth of a second, the resulting blanking period deletes only about ten percent of the coded signal which does not seriously affect its intelligibility.

For each position of the coding switches of the delay network 2, an irregular wave is generated at both the sending and transmitting apparatus. This wave is transmitted over the lines 39 and 41, as shown in the circuit of FIG. 1, or to an amplifier-limiter circuit 109 in a manner whereby the differently delayed components of the wave are applied in either polarity to the amplifier input circuit. This may be accomplished in any manner known in the art such, for example, a coupling the lines 39 and 41 to the grid circuit and cathode circuits, respectively, of the amplifier circuit. The sharp limiting action of the amplifier-limiter 109 produces a corresponding irregular rectangular wave $K_1$ shown in graph (F) of FIG. 5. In a similar manner the delay network 2' is connected to a second amplifier-limiter 111 through the lines 39', 41' whereby a second irregular rectangular wave $K_2$, shown in graph (G) of FIG. 5 is generated.

Figure 5:
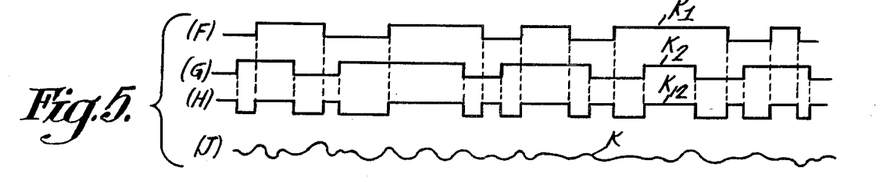
FIG. 5 is a series of graphs illustrating the operation of the circuit illustrated in FIG. 4.
Figure 9:
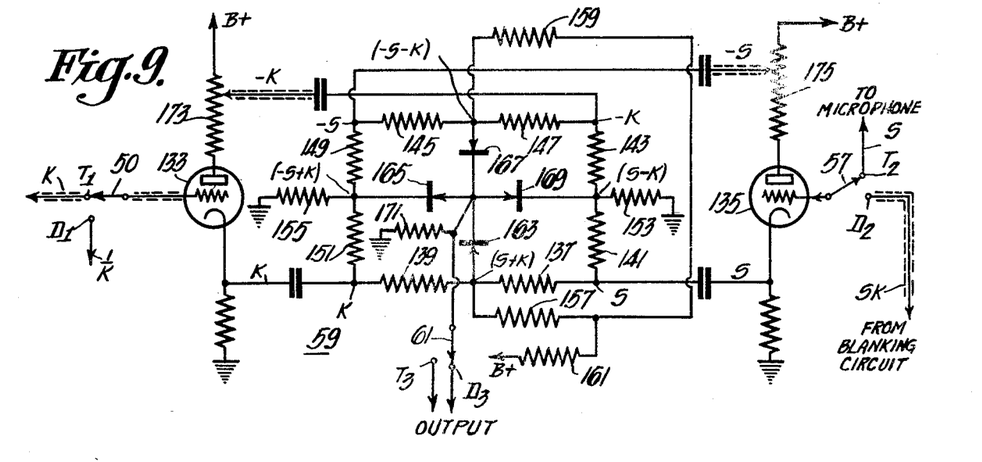
FIG. 9 is a schematic circuit diagram of the multiplier circuit forming portions of the circuits shown in FIGS. 1 and 4.

The rectangular irregular waves $K_1$ and $K_2$ are applied to a multiplier circuit 113, of the type shown and described herein with respect to FIG. 9 of the drawings, to derive a more complex rectangular wave $K_{12}$ shown in graph (H) of FIG. 5.

The complex wave $K_{12}$ will have a period of 0.4 second although it is composed of two waves $K_1$ and $K_2$, each having periods of the order of 0.02 second. Also, the complex wave $K_{12}$ will have the combined number of crossovers of the a-c axis of the rectangular waves $K_1$ and $K_2$. Since, however, the crossovers of the complex wave $K_{12}$ have short term repetition rates of the order of 1/47 and 1/50 seconds, it is necessary to distort the wave further to insure transmission security.

The limiting action of the limiters 109 and 111 increases the frequency spectrum of the waves $K_1$ and $K_2$ to about 2000 cycles, although each of the delay networks have cutoff frequencies of the order to 660 cycles. Since high frequency components of the wave $K_{12}$ are of low magnitude, the complex wave is passed through a high frequency booster network 115 of any conventional type which equalizes the frequency components up to about 2000 cycles per second. The equalized complex wave derived from the high frequency booster network 115 is applied to a phase distortion circuit 117 such, for example, as an RC lattice network which has the property of delaying various frequency components by different amounts whereby the relative phases of the various harmonic components of the complex wave are changed to form a radically different wave shape. The phase distortion circuit 117 also alters the square wave form of the complex wave form $K_{12}$ so as to obliterate the sharp corners thereof and to vary the lobes thereof over a wide variety of amplitudes. Excessively high lobes occurring in the distorted wave are removed by a mild limiting amplifier 119 from which is derived the final extremely complex coding wave K illustrated by graph (J). The complex coding wave K is applied to the reciprocal circuit 101 and to the fixed contact $T_1$ of the first "transmit-receive" switch 50 of the circuit of FIG. 1 as explained heretofore.

Judging from oscillographic observations of a complex coding wave of the type described, it is believed that the steps of multiplying and phase distorting the component waves $K_1$ and $K_2$ effectively masks all significant 47.7 cycle and 50 cycle characteristics which ordinarily would be observable in the transmitted coded signal. Therefore, the dual delay network wherein the separate code wave components are multiplied together and distorted, appears an economical and efficient electrical device for generating a code wave having a period as long as 0.4 second.

Figure 7:
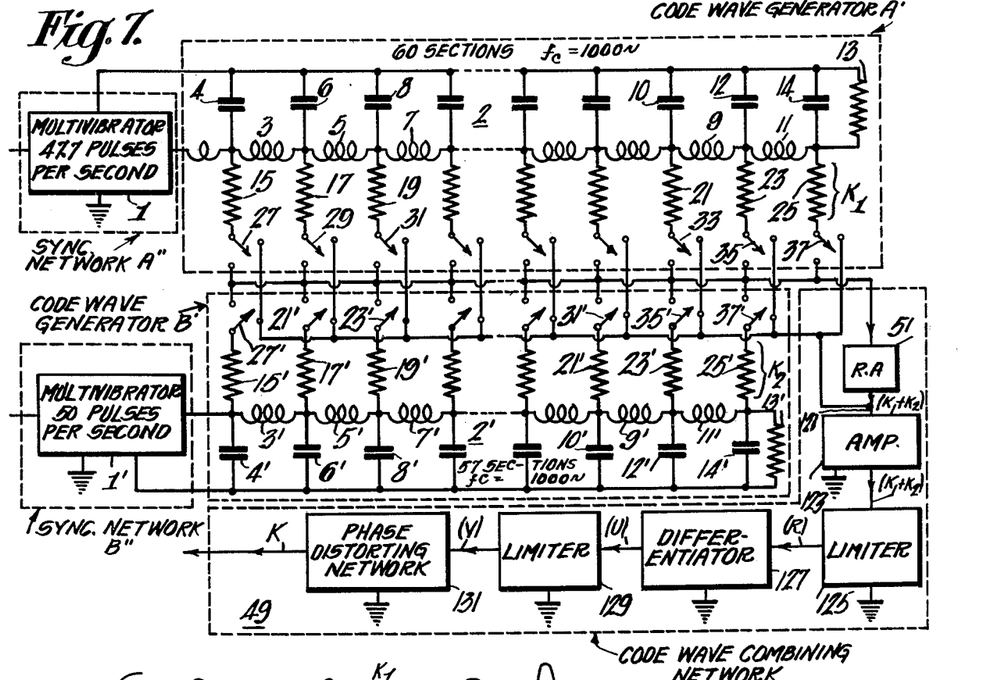
FIG. 7 is a schematic, partly block circuit diagram of a second embodiment of the invention.
Figure 8:
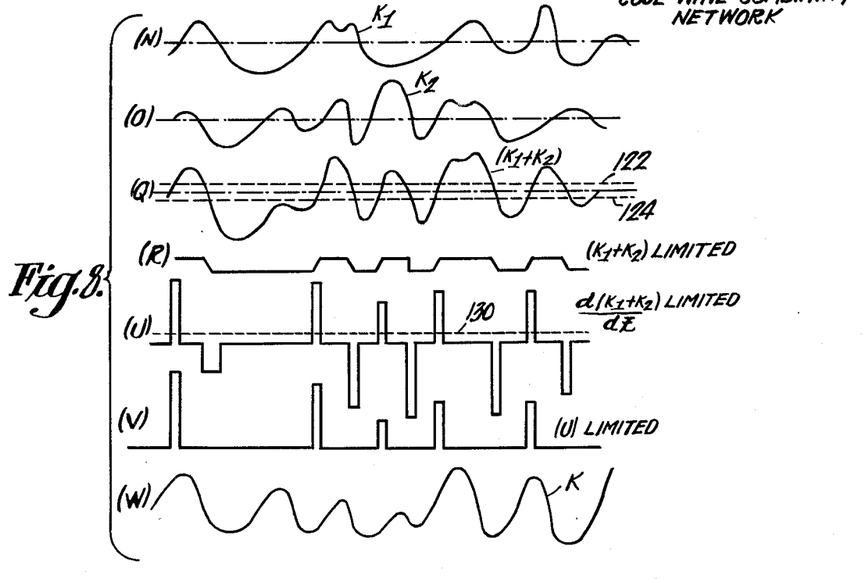
FIG. 8 is a series of graphs illustrating the operation of the circuit shown in FIG. 7.

FIG. 7 shows a second embodiment of the invention wherein the separate code wave components derived from the code wave generators A' and B' are added algebraically and further modified to provide a complex coding wave K. The complex coding wave component $K_1$ derived from the code wave generator A' is combined in both polarities in the line 121 with the second component code wave $K_2$ derived from the second code wave generator B' to provide a code wave $(K_1+K_2)$ as shown in graphs (N), (O), (Q) of FIG. 8. The wave $(K_1+K_2)$ is applied through an amplifier 123 to the input of a conventional limiter circuit 125 from which is derived the limited $(K_1+K_2)$ wave shown in graph (R) of FIG. 8, which corresponds to the wave of graph (Q) limited at the levels 122, 124.

The limited wave shown in graph (R) derived from the limiter 125 is applied to a differentiator circuit 127 which may comprise, for example, a series capacitor and shunt resistor network of a type well known in the art. The wave derived from the differentiator network 127 comprises a wave of the type shown in graph (U) of FIG. 8 which is applied to a second limiter 129, from which is derived the wave shown in graph (V) of FIG. 8, which corresponds to the wave of graph (U) limited at the level 130. The irregularly occurring pulses of the wave shown in (V) are applied to a phase distorting network 131, which may be of the type described in the circuit of FIG. 4, to derive an extremely complex coding wave K shown in graph (W) which may be applied to the reciprocal circuit 101 and to the first "transmit-receive" switch 50 of the circuit of FIG. 1.

The wave treatment of the combined waves $K_1$ and $K_2$ thus described is for the purpose of removing the similarity of the combined wave to its component waves. An additional purpose is to extend the upper frequency range of the coding wave to between 2000 and 3000 cycles which would not be possible for waves derived directly from the low-frequency cut-off delay networks.

SIGNAL MULTIPLIER

FIG. 9 shows a typical wave multiplier circuit forming a portion of both the coding wave transmitter and receiver circuits described heretofore with reference to FIG. 1, and a portion of the code wave combining network 49 of the circuit of FIG. 4 of the drawings. This multiplier circuit is described and claimed in applicant's copending U.S. application Ser. No. 517,967, filed Jan. 12, 1944, and assigned to the same assignee as the instant application. The circuit utilizes the property of well known electrical devices which provide an instantaneous output voltage which is proportional to the square of the instantaneous input voltage over a reasonable voltage range in a single polarity. Such circuits or devices will be referred to as "squaring circuits", and will be designated as $Q_1$, $Q_2$, $Q_3$, $Q_4$ where referred to hereinafter.

In the preferred form of the multiplying circuit, the waves S and K, for example, to be multiplied, are added together with four different polarity combinations and "squared" in four different signal channels. Then the four "squared" signals are added together with suitable polarities to obtain the product SK in the output circuit of the multiplier network, as will be illustrated by the following equations:

$$\text{Output of } Q_1 = (S + K + A_1)^2 = \quad (1)$$
$$S^2 + K^2 + A_1^2 + 2SK + 2KA_1 + 2A_1S$$

$$\text{Output of } Q_3 = (-S - K + A_1)^2 = \quad (2)$$
$$S^2 + K^2 + A_1^2 + 2SK - 2KA_1 - 2A_1S$$

$$\text{Output of } Q_4 = -(-(-S + K - A_1))^2 = \quad (3)$$
$$-(S - K + A_1)^2 = -S^2 - K^2 - A_1^2 + 2SK + 2KA_1 - 2A_1S$$

$$\text{Output of } Q_2 = -(-(S - K - A_1))^2 = \quad (4)$$
$$-(-S + K + A_1)^2 = -S^2 - K^2 - A_1^2 + 2SK - 2KA_1 + A_1S$$

$$\text{Sum Output} = \quad 8SK \quad (5)$$

It will be understood that the term $A_1$ in the above equations is the d-c bias added to the a-c waves to cause all of the signal amplitude variations to have the same polarity with respect to the squaring devices.

The squaring circuit illustrated employs a plurality of small copper oxide rectifiers known commercially as "Varistors". Because of the particular variable resistance characteristics of the "Varistor", the current therethrough is substantially proportional to the square of the applied voltage over a reasonable applied voltage range in a single polarity. The signal multiplier network is shown as including a first triode thermionic tube 133 having its grid electrode connected to the movable contact of the first "transmit-receive" switch 50, whereby signals characteristic of either the coding wave K or the reciprocal thereof 1/K may be applied to the tube grid cathode circuit. A second thermionic tube 135 has its grid electrode connected to the movable contact of the second "transmit-receive" switch 57, whereby either the speech signals S or the blanked, received signals SK may be applied to the tube grid-cathode circuit. The operation of the circuit will be explained hereinafter with the switches 50 and 57 in the "transmitting" position whereby the signals K and S, respectively, are applied to the grid-cathode circuits of the tubes 133 and 135. Push-pull output signals are derived from each of the tubes by means of connections to the corresponding tube anode and cathode circuits as indicated in the drawing.

In order that the desired sum voltages be obtained, the signals S and K are applied to a network of resistors in the following manner: Signals S and K, respectively, traverse resistors 137 and 139 to provide a signal proportional to (S+K) at point (S+K); the signals S and −K respectively traverse resistors 141 and 143 to provide signal (S−K); the signals −S and −K respectively traverse resistors 145 and 147 to provide signal (−S−K); and the signals −S and K traverse respectively resistors 149 and 151 to provide signal (−S+K). Thus, at each of the four junction points, a sum of voltage is obtained as designated in the circuit diagram. As shown, the network also includes resistors 153 and 155 leading respectively from points (S−K) and (−S+K) to ground, and resistors 157 and 159 leading respectively from points (S+K) and (−S−K) to the positive terminal of the source of bias voltage which is applied through a voltage-reducing resistor 161. An 8000-ohm resistance has been found satisfactory for the resistors 153, 155, 157, and 159 while 100,000-ohm resistance has been taken as the value of resistors 137, 139, 141, 143, 145, 147, 149, and 151.

The sum voltages at the four points of the network are applied with bias voltage A or −A to four Varistors 163, 165, 167 and 169, all of which control the current through the common load resistor 171 to provide thereacross the product output voltage SK. The output voltage across resistor 171 is proportional to the sum of all the voltages which would have been generated if each Varistor had supplied current to a separate resistor, as indicated by the foregoing squaring equations. It is to be noted that the Varistors 165 and 169 are connected with opposite polarities from the Varistors 163 and 167, so that the d-c bias voltage must be different. By reference respectively to the third and fourth equations it will be seen that the values (−S+K−A) and (S−K−A) are each preceded by another minus sign and included in brackets before squaring to indicate properly mathematically the effect of the reversed connection on these two Varistors. These five equations show, that, ideally, only the desired voltage SK is produced across the output resistor 171.

For compensating for small dissimilarities in the Varistors and other circuit elements, it has been found desirable to provide variable resistors 173 and 175 connected as voltage dividers in the anode circuits of the tubes 133 and 135 respectively for adjusting the relative amplitudes of −S and −K.

While in the foregoing the term "multiplying circuit" has been used to define the circuit, it will be seen that the circuit actually is a sort of modulator which is completely balanced in the sense that only the side band frequencies are produced, while the input frequencies and the harmonics thereof are suppressed.

The output signal SK derived from across the output resistor 171 are applied to the movable contact of the third "transmit-receive" switch 61 whereby they may be selectively applied to either the reproducer 103 or to the first signal mixer 63 depending upon the desired operation of the circuit of FIG. 1.

SIGNAL RECIPROCAL CIRCUIT

The reciprocal circuit 101 shown in FIG. 5 of the drawing is described and claimed in the copending application of Carl A. Meneley Ser. No. 484,304 filed Apr. 23, 1943, now U.S. Pat. No. 2,403,540, granted July 9, 1946 and assigned to the same assignee as the instant application. In this circuit instantaneous reciprocal values of an applied coding wave K are obtained by means of an electrical network in which the wave K ia clipped on both its positive cycle and on its negative cycle to produce a substantially rectangular wave, and in which the wave K and the rectangular wave are added together with one of them reversed in polarity preferably after the peaks of the positive and negative cycles of the wave K have been "squashed" or flattened somewhat. The circuit includes no appreciable capacitive or inductive reactances (the blocking capacitors in the circuit presenting negligible impedance) and, therefore, provides the reciprocal of substantially any applied signal wave form regardless of its frequency components.

Figure 10:
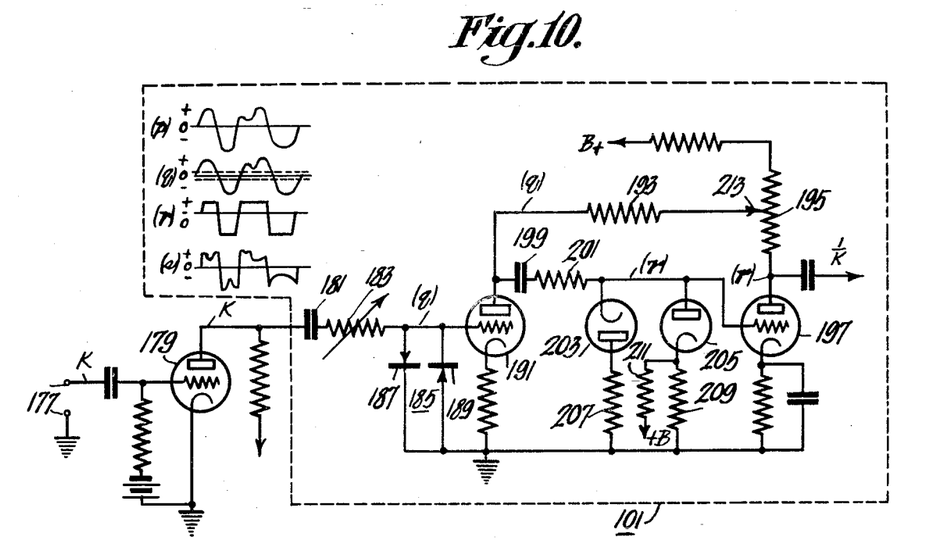
FIG. 10 is a schematic circuit diagram of the reciprocal circuit forming a portion of the circuit shown in FIG. 1.

Referring to FIG. 10, the graph (p) represents a typical coding wave K which is applied to the input terminals 177 of the circuit. The graph (s) represents the reciprocal wave 1/K, which is the sum of the flattened wave K, represented by the graph (q), of reversed polarity, and of the rectangular wave shown in graph (r). The squashed or flattened wave (q) may be obtained by passing the wave (p) through a circuit that changes its resistance with a change in applied voltage. The rectangular wave (r) may be produced by clipping the positive and negative cycles of the wave (q) at the voltage levels (t) and (u) respectively, for example, close to the a-c axis of the signal, and then by amplifying the clipped signal.

The wave K applied to the input terminals 177 may, if desired, be amplified by means of an amplifier tube 179 to provide a peak-to-peak amplitude, for example, of the order of 60 volts. The amplified K wave then is applied through a blocking capacitor 181 and a resistor 183 to a copper oxide rectifier unit 185 which functions as a non-linear resistor having the property of decreasing in resistance as the applied voltage increases. The resistor 183 is of high enough resistance so that the driving source for the non-linear resistance unit 185 is of high impedance whereby there is only a slight variation in the current flow through the unit 185. The unit 185 may consist of a pair of copper oxide rectifiers 187 and 189 connected to conduct current in opposite directions.

The voltage appearing across the non-linear unit 185 is the voltage wave (q), which is the wave k having a flattened wave form. This voltage is amplified by a cathode biased vacuum tube 191, and appears across an anode resistor 193 and a portion of the anode resistor 195 of a second amplifier tube 197.

The rectangular wave (r) is produced, in this particular example, by applying the output of the tube 191 through a blocking capacitor 199 and a high impedance resistor 201 to a pair of diodes 203 and 205, which are connected to conduct in opposite directions. Resistors 207 and 209, of comparatively low resistance are connected in series with the diodes 203 and 205, respectively. A biasing voltage drop for opposing current flow through diode 205 is produced across the resistor 209 by connecting a source of voltage (not shown) thereacross, a resistor 211 being in series with the voltage source. The diodes 203 and 205 clip the applied wave (q) symmetrically about its a-c axis, because a voltage which causes current flow through the diode 203 and resistor 207 is built up across the capacitor 199 by the positive cycle pulses flowing through the diode 205. Thus, the diodes 203 and 205 become conducting on alternate cycles when the signal voltage exceeds the d-c voltage drop across the resistors 207 and 209, respectively. The resulting rectangular wave (r) is amplified and reversed in polarity by the tube 197. The wave (q) and the flattened wave (r) add in the portion of the anode resistor 195 that is common to the tubes 191 and 197 to produce the desired reciprocal wave l/K shown in graph (s).

If the wave (q) is flattened correctly, and if the waves (q) and (r) are added with the correct relative amplitudes, the resulting signal will be substantially a true reciprocal of the wave K. The only substantial departure from the true reciprocal signal will be where the wave K crosses the a-c axis. Here the reciprocal value is infinity whereas the maximum amplitude of the wave 1/K necessarily has a finite limit. The waves (q) and (r) may be mixed with the correct relative amplitudes by adjusting a variable tap 213 on the anode resistor 195. The correct shaping of the flattened wave (q) may be obtained by selecting a non-linear resistor unit 185 having a suitable voltage-resistance characteristic and by adjusting the value of the variable resistor 183.

As previously noted, the above-described reciprocal circuit is purely resistive so that its operation is independent of frequency. The instantaneous voltage output of the circuit is always substantially the reciprocal of the instantaneous applied voltage. It follows that if the reciprocal circuit is adjusted to produce the reciprocal of an applied signal having one wave form, the circuit will then always produce the reciprocal of an applied signal regardless of its wave form. There are various ways of determining when the circuit has been adjusted to give substantially a true reciprocal. One way is to connect the reciprocal circuit into the signalling system of FIG. 1 and, while transmitting speech or music, adjust the resistor 183 and the variable tape 213 at the receiver until the speech or music has a minimum of distortion.

It should be understood that oppositely-connected diodes may be substituted for the copper oxide rectifiers 187 and 189, described heretofore. When properly biased, the two diodes should be operated along the lower knee of their operating characteristic and in the proper region to shape the wave K in the desired manner to provide the wave (q).

It will be understood that the reciprocal circuit is not limited to the particular circuit components illustrated since the waves (q) and (r) may be derived from the wave K in various other ways, and since the two waves may be combined by means of a variety of other circuits.

MOTOR-DRIVEN SELECTOR SWITCH MECHANISM

Referring to FIGS. 11, 12, 13 and 14, a motor-driven selector switch mechanism is provided which changes the characteristics of the complex coding wave K slightly at intervals of 0.4 second whereby the coding wave characteristics are continuously changed over a period of approximately one hour and six minutes for a predetermined initial setting of the coding contact discs.

Figure 11:
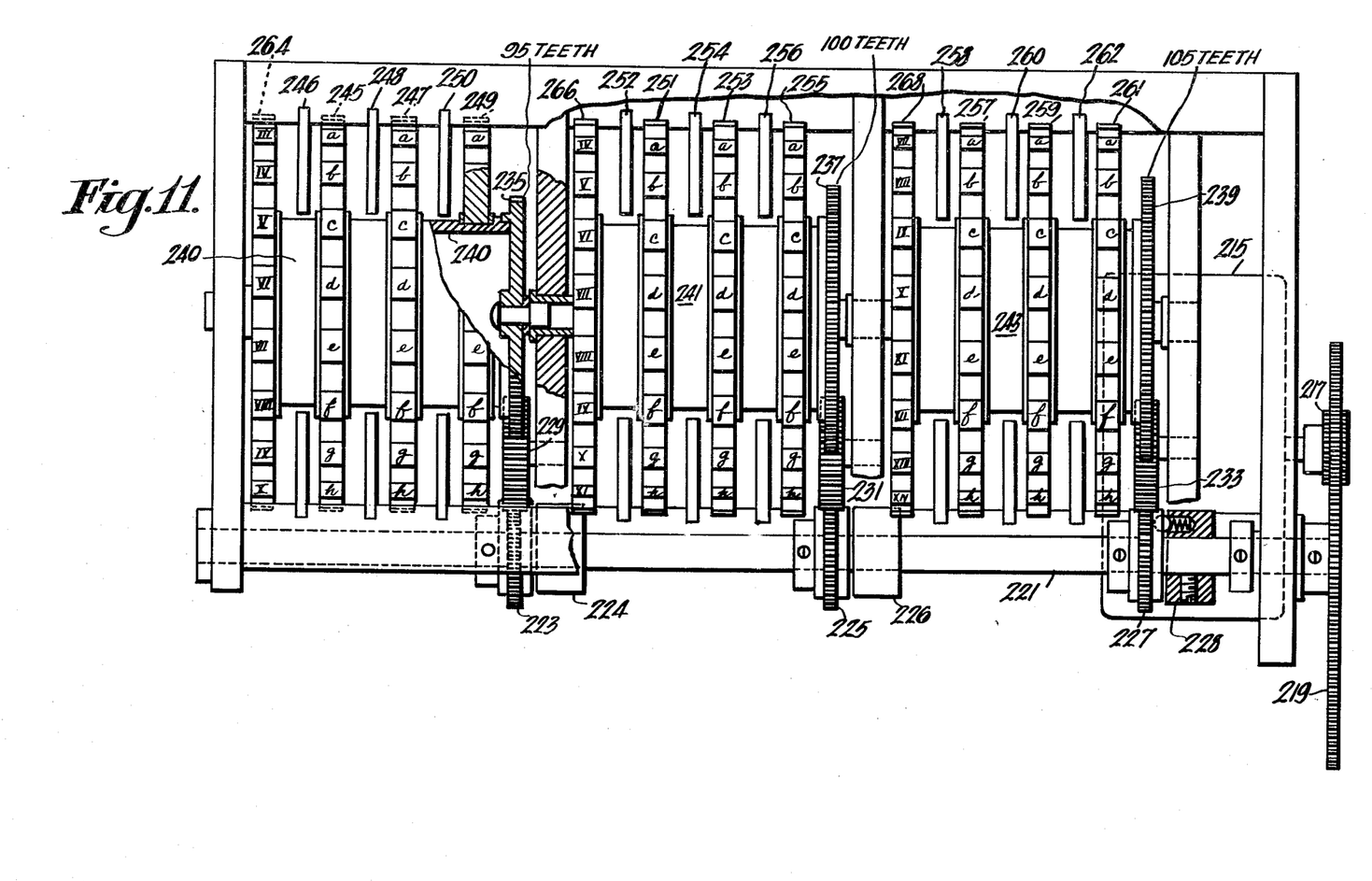
FIG. 11 is a fragmentary, front elevational view of a code wave switching mechanism forming a portion of the system shown in FIG. 1.
Figure 12:
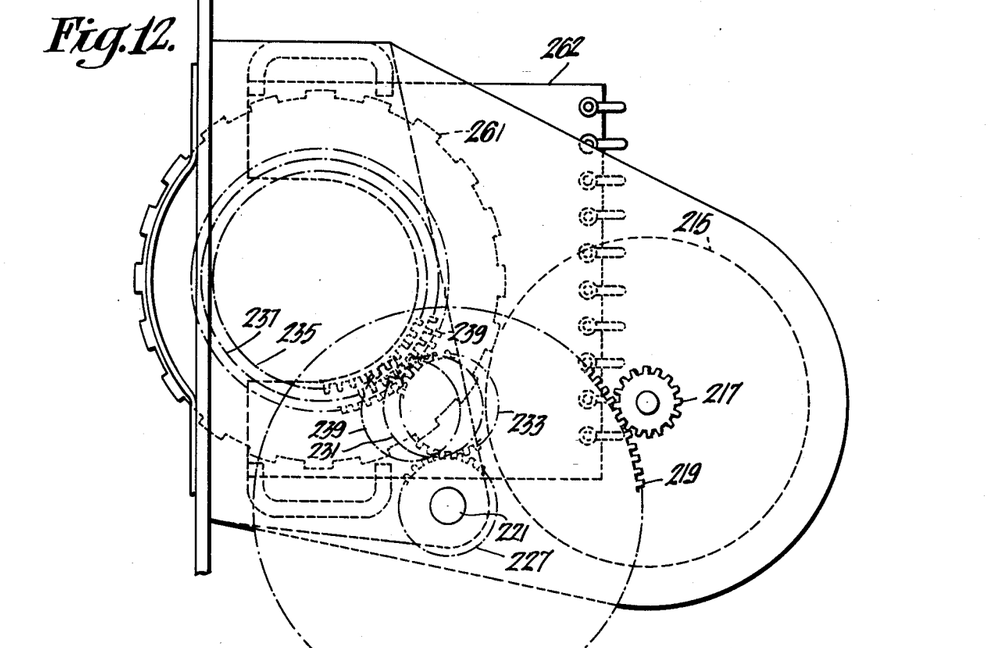
FIG. 12 is a fragmentary end elevational view of said switching mechanism.

Referring to FIGS. 11 and 12, the motor-driven switch mechanism includes a motor 215 which drives a first pinion gear 217 at substantially constant speed. The first pinion gear 217 drives a large reduction gear 219 which rotates a main drive shaft 221 having three similar secondary pinion gears 223, 225 and 227 coupled thereto by any type of conventional detents 224, 226, 228 at regular spaced intervals. The secondary pinion gears 223, 225, 227 drive intermediate pinion gears 229, 231 and 233, respectively, which in turn drive three separate spur gears 235, 237, 239, having, for example, 95, 100 and 105 teeth, respectively. The gear train thus described provides rotation of the spur gears 235, 237, 239 at speeds, for example, of 5.7, 6.0 and 6.3 r.p.m., which bears the relation 19:20:21. Each of the spur gears 235, 237 and 239 drives a separate hollow drum 240, 241 and 243, respectively, which carries a timing disc and three separate coding contact discs. Fixed brush holders disposed between these discs engage separate ones of the contact discs in a manner to provide fifteen single-pole double-throw switches for each of the three groups of differentially rotating contact discs. The resulting forty-five single-pole, double-throw switches are connected through the blocking resistors shown in the circuit of FIG. 1 in irregular order to control the eighty-four taps in the dual delay networks of the coding wave generators A', B'.

As explained heretofore, a predetermined rotational arrangement of the coding discs 245, 247, 249, 251, 253, 255, 257, 259 and 261, with respect to their complementary fixed brush holders 246, 248, 250, 252, 254, 256, 258, 260 and 262, permits continuous variation of the complex coding wave characteristics for a period of the order of one hour and six minutes at a motor speed of 100 r.p.m. By means of detent mechanisms on each of the switch contact discs, the relative disc rotational arrangement may be changed at hourly intervals to provide an entirely different coding wave for each hour of operation, whereby the coding wave characteristics may be made substantially non-repetitive over an extremely long period. The timing discs 264, 266, and 268 are fastened rigidly to their corresponding hollow shafts 240, 241 and 243 to provide means for orienting each group of coding discs. When any timing disc is manually adjusted, the corresponding detent on the shaft 221 permits the corresponding secondary pinion gear to be rotated to a new angular position on the shaft.

The motor drive at the transmitter unit may be synchronized with the motor drive at the receiver unit in any manner known in the art such, for example, as the inclusion of a synchronizing tone in the transmitted signal. An alternative arrangement might employ crystal, or fork, controlled generators at both transmitter and receiver which operate at substantially constant frequencies to synchronize the motors over extended operating periods. Various well known methods of phasing synchronizing motors may be employed if desired.

Figure 13:
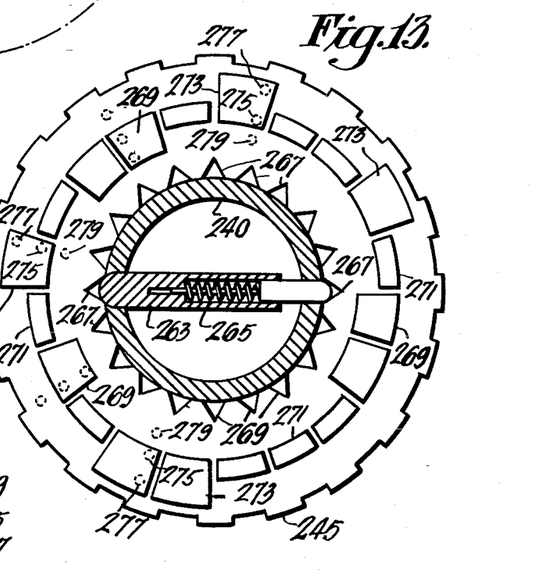
FIG. 13 is a side elevational view of one of the rotatable contactor disks forming a portion of said switching mechanism.
Figure 14:
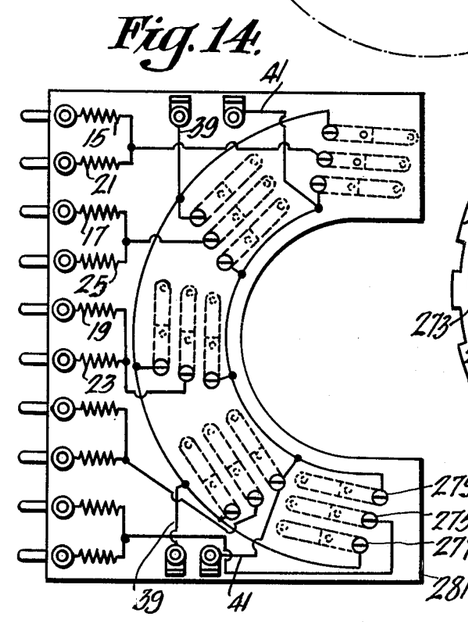
FIG. 14 is a side elevational view of one of the fixed brush holders forming another portion of said mechanism operating complementarily with said contactor disk.

More detailed construction of the contact discs and complementary brush holders is shown in FIGS. 13 and 14, wherein a typical one of the contactor discs 245 is mounted upon the tubular shaft 240 and adjustably keyed thereto by a diammetrically disposed two section telescoping pin 263. The pin normally is expanded by an intermediate compression spring 265 to project at opposite sides of the shaft and engage a pair of notches 267 provided in the inner face of the disc 245. In effect, the pin 263 and the notches 267 which extend entirely around the inner face of the disc comprise a detent mechanism which permits the disc to be rotated manually for presetting the individual disc position with respect to the motor driven gear mechanism.

Concentrically arranged around the central axis of the disc are three series of side face contactors 269, 271 and 273, preferably comprising silver segments insulated from each other. The silver segments are of three types which are located in irregular order of different radial dimensions, but all of which have a portion in the same intermediate radial circular path. Thus the short intermediate contactors 271 define neutral positions of the switches; the long outer contactors 273 define positive positions of the switches and the long inner contactors 269 provide negative positions of the switches in terms of the pulse components of the coding wave. As shown, the inner edges of the long outer contactors 273 align circumferentially with the inner edges of the short intermediate contactors 271, but the radial length of such long outer contactors 273 is approximately twice that of the intermediate contactors 271. The outer edges of the long inner contactors 269 align circumferentially with the outer edges of the short intermediate contactors 271, but the radial length of such long inner contactors 269 is also approximately twice that of the intermediate contactors 271.

Hence, in the rotation of the disc, the intermediate contactors 271 are arranged to wipe successively one intermediate series of brushes 275; the long outer contactors 273 successively wipe said intermediate series of brushes 275 and an outer series of brushes 277 in pairs, one brush of each series being wiped simultaneously. Similarly, the long inner contactors 269 successively wipe said intermediate series of brushes 275 and an inner series of brushes 279 in pairs, one brush from each of the latter series being wiped simultaneously.

Referring to FIG. 14, each of the brush series 275, 277, 279 has five brushes, corresponding brushes of each series being spaced at similar or slightly different angular intervals so as to be wiped concurrently by the contactors on the contactor disc 245. The sets of brushes are mounted upon an insulating plate 281, which in assembled condition, as shown in FIG. 11, is in close proximity to the contactor side of the rotatable disc 245, in order that the respective contactors may contact with and bridge any pair of brushes to be selected, so as to close predetermined circuits for the generation of the coding waves.

Thus the invention disclossed comprises an improved method of and means for generating extremely complex electrical waves by selecting predetermined delayed signal components from a plurality of differently pulse-excited delay networks and wherein said derived signal components are combined to form said complex wave. It should be understood that the invention is not limited to pulse-excited delay networks but includes any and all means for and methods of generating a complex wave having a relatively long period by combining two less complex but different waves each having relatively short periods. One embodiment of the invention combines the derived signal components in a manner whereby the complex electrical wave has instantaneous ordinates corresponding to the product of the instantaneous ordinates of the derived signal components. Another embodiment of the invention provides a complex electrical wave having ordinates which are the algebraic sum of the ordinates of each of the derived signal components. The invention is illustrated herein, by way of example, as a component of a secret telecommunication system wherein such complex wave generators are employed to provide coding and decoding waves at a transmitter and receiver. The synchronizing system for such coding wave generators also is described. A motor driven switching mechanism is disclosed which provides continuously changing selection of the delayed signal components in each of the delay networks in a manner whereby the derived complex signal is non-repetitive for an extended time interval.

I claim as my invention:

1. In a secret communication system, the method of producing a complex coding wave which is a function of the voltages produced at successive time intervals in a plurality of electrical networks which method comprises generating a plurality of different concurrent short period series of pulses, applying a different one of said series of pulses to each of said networks to derive delayed unmodulated pulse signal components from each pulse of each of said series of pulses combining said delayed pulse signal components in predetermined polarities, and deriving from said combined components said complex wave, said complex wave having a substantially longer period than either of said short period pulse series.

2. In a secret communication system, the method of utilizing a plurality of delay networks for generating a complex coding wave comprising generating a plurality of different concurrent short period series of pulses, applying a different one of said series of pulses to each of said delay networks to derive therefrom delayed unmodulated pulse components from each pulse of each of said series of pulses, changing the polarity of at least some of said delayed pulse components, and combining said delayed pulse componenets and said delayed pulse components of different polarities to form said complex wave, said complex wave having a substantially longer period than either of said short period pulse series.

3. In a secret communication system, the method of producing a complex coding wave which is the algebraic sum of the voltages produced at different points in a plurality of electrical networks, which comprises creating a plurality of concurrent short period series of discrete electrical pulses, applying a different one of said series of pulses to each of said networks to derive therefrom unmodulated pulse signal components at different time intervals, combining said derived pulse components in predetermined polarities, and deriving from said combined components said complex wave, said complex wave having a substantially longer period than either of said short period pulse series.

4. In a secret communication system, the method of producing a code wave which is a function of the voltages produced at different time intervals in a plurality of electrical networks, which comprises producing a plurality of concurrent short period series of pulses, applying a different one of said series of pulses to each of said networks to derive therefrom delayed unmodulated pulse components, combining said derived pulse signal components in predetermined polarity to form said code wave, said complex wave having a substantially longer period than either of said short period pulse series and periodically changing said time intervals and said pulse signal component polarities in a prescribed irregular order to change said code wave.

5. The method of secret communication which comprises producing a message signal, producing a plurality of series of pulses, applying a different one of said series of pulses to different ones of a plurality of electrical networks to derive therefrom delayed pulse components, changing the polarity of at least some of said delayed components, combining said delayed components and the delayed components of different polarity to form a complex code wave, modifying said message signal with said code wave to derive a coded signal, transmitting said coded signal to a point of reception, producing a second complex code wave at said point of reception, said second code wave having an envelope which is substantially the reciprocal of the envelope of said original code wave, receiving said transmitted coded signal, and modifying said received coded signal by said second code wave to reproduce said message signal.

6. The method of secret communication which comprises producing a message signal, producing a plurality of series of pulses, applying a different one of said series of pulses to different ones of a plurality of electrical networks to derive therefrom delayed pulse components, changing the polarity of at least some of said delayed components, combining said delayed components and said delayed components of different polarities to form a code wave, multiplying the instantaneous magnitudes of said message signal by the instantaneous magnitudes of said code wave to obtain a coded signal, transmitting said coded signal to a point of reception, receiving said transmitted coded signal, producing a second code wave at said point of reception, said second code wave having an envelope which is substantially the reciprocal of the envelope of said original code wave, and multiplying the instantaneous magnitudes of said received coded signal by the instantaneous magnitudes of said second code wave to reproduce said transmitted message signal.

7. The method of secret communication which comprises producing a message signal, producing a plurality of different series of pulses, applying a different one of said series of pulses to different ones of a plurality of electrical networks to derive therefrom delayed pulse components, changing the polarity of at least some of said delayed components, combining said derived components and said delayed components of different polarities to form a complex code wave, modifying said message signal by said code wave to obtain a coded signal, transmitting said coded signal to a point of reception, receiving said transmitted coded signal, producing a second code wave at said point of reception of which the instantaneous magnitudes are substantially the reciprocal of the instantaneous magnitudes of said original code wave, synchronizing said second code wave with said original code wave, and modifying said coded signal by said second code wave to render said message signal intelligible.

8. The method of secret communication which comprises producing a message signal, producing a plurality of different series of pulses, applying a different one of said series of pulses to different ones of a plurality of electrical networks to derive therefrom delayed pulse components, changing the polarity of at least some of said delayed components, combining said delayed components and said delayed components of different polarities to form a code wave, multiplying the instantaneous magnitudes of said message signal by the instantaneous magnitudes of said code wave to obtain a coded signal, transmitting said coded signal to a point of reception, receiving said transmitted coded signal, producing a second code wave at said point of reception, said second code wave having instantaneous magnitudes which are substantially the reciprocal of said original code wave, synchronizing said second code wave with said original code wave, and multiplying the instantaneous magnitudes of said received coded signal by the instantaneous magnitudes of said second code wave to render said message signal intelligible.

9. The method of producing a complex wave which comprises producing a plurality of different concurrent short period series of pulses, reversing the polarity of predetermined ones of said pulses to provide a succession of incremental voltages of predetermined polarity, and combining said voltages, and deriving from said combined voltages a complex wave as an aggregate of said incremental voltages, said complex wave having a substantially longer period than either of said short period pulse series.

10. Apparatus for generating a complex wave comprising means for generating a plurality of different concurrent short period series of pulses, a plurality of electrical networks, means for applying a different one of said series of pulses to each of said electrical networks, means for deriving a plurality of differently delayed unmodulated pulse signals from each of said networks in response to said applied series of pulses, means for combining said derived signals from predetermined ones of said networks, and means for selecting in a predetermined manner said delayed signal components, and means for deriving from said selected signal components a complex wave having a period longer than either of said selected pulse periods, said complex wave having a substantially longer period than either of said short period pulse series.

11. Apparatus for generating a complex wave comprising means for generating a plurality of different series of pulses, a plurality of electrical networks, means for applying a different one of said series of pulses to each of said electrical networks, means for deriving a plurality of differently delayed signals from each of said networks in response to said applied series of pulses, means for changing the polarity of at least some of said delayed signal components, means for combining said derived signals and said signals of delayed different polarity from predetermined ones of said networks, and means for selecting in a predetermined manner said delayed signal components to produce said complex wave.

12. The method of secret communication which comprises producing a message signal, producing a plurality of different series of pulses, applying a different one of said series of pulses to different ones of a plurality of electrical delay networks whereby pulse waves having different time delay characteristics are produced at predetermined points in each of said delay networks, combining predetermined ones of said delayed series of pulses to form a complex code wave, altering said message signal by said code wave to form an unintelligible coded wave, transmitting said coded wave to a receiving station, receiving said transmitted coded wave at said receiving station, generating a second code wave at said receiving station, said second code wave having instantaneous magnitudes which are substantially identical to said first mentioned code wave, deriving a decoding wave from said second code wave having instantaneous magnitudes which are substantially the reciprocal of the instantaneous magnitudes of said second coded wave, and altering said received coded wave by said reciprocal wave to decode said transmitted coded wave.

13. The method of generating a complex wave which comprises producing a plurality of concurrent short period series of recurrent discrete pulses, applying a different one of said series of pulses to different ones of a plurality of electrical delay networks whereby different pulse waves having predetermined different time delay characteristics are produced at predetermined points in each of said delay networks, selecting and mixing predetermined ones of a plurality of said delayed series of pulses, and means for deriving from said mixed pulses a complex wave having a longer period than either of said mixed pulse periods, said complex wave having a substantially longer period than either of said short period pulse series.

14. The method of claim 13 including the step of synchronizing said plurality of series of pulses with pulses from another similar system whereby two similar synchronized complex waves are produced.

15. The method described in claim 13 including the step of reversing the polarity of predetermined ones of said delayed pulses before said pulses are mixed.

16. The method described in claim 13 including the step of periodically changing the selection of at least one of said delayed pulse waves.

17. Apparatus for generating a complex electrical wave comprising a plurality of electrical networks, means for concurrently exciting said networks at different non-harmonically related signal frequencies, means for concurrently deriving a plurality of differently delayed signal components from each of said networks, means for combining said derived signal components to derive a complex wave having a longer period than either of said combined signal periods, and means for deriving from said combined signal components a complex wave having a longer period than either of said combined signal periods.

18. Apparatus of the type described in claim 17 including means for reversing the polarity of predetermined ones of said derived signal components.

19. An electrical switching device comprising a plurality of movable switch contact elements, a plurality of fixed switch contact elements juxtaposed with said movable elements so that predetermined ones of said movable contact elements selectively bridge predetermined others of said contact elements, and means for positioning different ones of said movable contact elements at different relative rates with respect to others of said movable elements.

20. The method of producing a relatively long period complex electrical pulse wave which comprises producing a first complex pulse wave having a relatively short period, concurrently producing a second complex pulse wave having a different relatively short period and modulating said first and second short period pulse waves to produce said long period wave.

21. The method of producing a relatively long period complex electrical pulse wave which comprises producing a first complex pulse wave having a relatively short period, concurrently producing a second complex pulse wave having a different relatively short period, limiting said first and second short period pulse waves, and multiplying said limited short period pulse waves to produce said complex long period wave.

22. The method described in claim 20 including the step of phase-distorting said long pulse period wave to vary in an irregular manner the intervals between reversals in polarity of said pulse wave with respect to its a-c axis, whereby the periodicity of said first and said second short period pulse waves is substantially obscured.

23. The method described in claim 20 including the step of changing the wave form of each of said short period waves at intervals substantially greater than said short periods and less than the period of the beat frequency of said low period waves, whereby said beat frequency periodicity is substantially obscured in said resulting long period wave.

* * * * *

UNITED STATES PATENT AND TRADEMARK OFFICE
CERTIFICATE OF CORRECTION

PATENT NO. : 4,232,186

DATED : November 4, 1980

INVENTOR(S) : Alda V. Bedford

It is certified that error appears in the above-identified patent and that said Letters Patent is hereby corrected as shown below:

```
Column 6,  line 50, "CODED" should be --CODING--.
Column 7,  line 13, "(d)" should be --(h)--.
Column 8,  line 26, "derived" should be --desired--.
Column 9,  line 18, "sgnal" should be --signal--.
Column 10, line 11, "dealy" should be --delay--.
Column 10, line 33, "fo" should be --for--.
Column 12, equation 4, "A_1 S" should be --2A_1 S--.
Column 14, line 22, "ia" should be --is--.
Column 14, line 64, "k" should be --K--.
Column 15, line 53, "tape" should be --tap--.
Column 17, line 59, "disclossed" should be --disclosed--.
```

Signed and Sealed this

Thirteenth Day of January 1981

[SEAL]

Attest:

SIDNEY A. DIAMOND

Attesting Officer

Commissioner of Patents and Trademarks